United States Patent [19]

Beguinot et al.

[11] Patent Number: 5,855,845
[45] Date of Patent: Jan. 5, 1999

[54] LOW ALLOY STEEL FOR THE MANUFACTURE OF MOLDS FOR PLASTICS

[75] Inventors: Jean Beguinot, Le Creusot; Gilbert Primon, Saint Vallier; Frédéric Chenou, Le Creusot, all of France

[73] Assignee: Creusot Loire Industrie Societe Anonyme, Puteaux, France

[21] Appl. No.: 848,671

[22] Filed: Apr. 29, 1997

[30] Foreign Application Priority Data

Apr. 29, 1996 [FR] France ................................... 96 05336

[51] Int. Cl.$^6$ ........................... C22C 38/44; C22C 38/40; C22C 38/50
[52] U.S. Cl. .............................. 420/84; 420/87; 420/106; 420/108; 420/109; 148/333; 148/334; 148/335
[58] Field of Search ..................... 148/333, 334, 148/335; 420/106, 108, 109, 84, 87

[56] References Cited

U.S. PATENT DOCUMENTS

| | | |
|---|---|---|
| 3,970,448 | 7/1976 | Wilson, Jr. et al. . |
| 4,673,433 | 6/1987 | Roberts . |
| 5,110,379 | 5/1992 | Finkl . |
| 5,244,626 | 9/1993 | Finkl et al. ............................. 420/109 |

FOREIGN PATENT DOCUMENTS

| | | |
|---|---|---|
| A-0 225 425 | 6/1987 | European Pat. Off. . |
| A-1 009 924 | 6/1963 | United Kingdom . |
| A-1 098 952 | 1/1965 | United Kingdom . |

OTHER PUBLICATIONS

Patent Abstracts of Japan vol. 95, No. 0004 and JP–A–07 102342 (Sanyo Special Steel Co., Ltd.), Apr. 18, 1995.

Patent Abstracts of Japan vol. 16, No. 261 (C–950), JP–A–04 059942 (Aichi Steel Works Ltd.), Feb. 26, 1996.

Patent Abstracts of Japan vol. 14, No. 232 (C–719), May 17, 1990 and JP–A–02 057632 (Nippon Steel Corp.), Feb. 27, 1990.

Patent Abstracts of Japan vol. 14, No. 215 (C–716), May 8, 1990 and JP–A–02 050910 (Nippon Steel Corp.), Feb. 2, 1990.

*Primary Examiner*—Deborah Yee
*Attorney, Agent, or Firm*—Oblon, Spivak, McClelland, Maier & Neustadt, P. C.

[57] ABSTRACT

Steel for the manufacture of molds for injection molding of plastics, wherein its chemical composition contains, by weight: $0.35\% \leq C \leq 0.5\%$, $0\% \leq Si \leq 0.5\%$, $0.2\% \leq Mn \leq 2.5\%$, $0\% \leq Ni \leq 4\%$, $0\% \leq Cr \leq 4\%$, $0\% \leq Mo+W/2 \leq 2\%$, $0\% \leq Cu \leq 1\%$, $0\% \leq V+Nb/2+Ta/4 \leq 0.5\%$, $0.005\% \leq Al \leq 0.2\%$, $0\% \leq B \leq 0.015\%$, $0\% \leq Ti+Zr/2 \leq 0.3\%$, $0\% \leq S+Se+Te \leq 0.2\%$, $0\% \leq Pb+Bi \leq 0.2\%$, $0\% \leq Ca \leq 0.1\%$, the remainder being iron and impurities resulting from the production, the analysis simultaneously satisfying the following relationships: $Cr+3\times(Mo+W/2)+10\times(V+Nb/2+Ta/4) \geq 1$, $R=3.8\times C+10\times Si+3.3\times Mn+2.4\times Ni+1.4\times(Cr+Mo+W/2) \leq 11$, $Qu=3.8\times C+1.1\times Mn+0.7\times Ni+0.6\times Cr+1.6\times(Mo+W/2)+kB \geq 3$, with $kB=0.5$ if $B \geq 0.0005\%$ and $kB=0$ if not, and: $R \leq Max(2.33\times Qu-1, 0.9\times Qu+4)$.

20 Claims, No Drawings

LOW ALLOY STEEL FOR THE MANUFACTURE OF MOLDS FOR PLASTICS

FIELD OF THE INVENTION

The present invention relates to a low-alloy steel used especially for the manufacture of molds for plastics.

Moulds for plastics or for rubber are manufactured by machining massive blocks of metal whose thickness can reach 1.5 meters. The objective of the machining is especially to form a cavity which has the shape of the object to be obtained by molding. In most cases the surface of the cavity is either polished or chemically grained in order to impart the desired surface appearance to the objects obtained by molding. Since the molding operation takes place by injection of hot plastic under pressure, the mold must, firstly, withstand the forces generated by the pressure of the plastic, secondly, remove heat from the plastic as quickly as possible to increase the output efficiency of the molding operations and, finally, resist the wear due to the friction of the plastic on the cavity surface. In addition, the characteristics of the steel must remain stable during its use, that is to say must be insensitive to the temperature cycles produced by the molding operations and must remain as homogeneous as possible, including in the thickest sections. To satisfy all these conditions it would be necessary to have at one's disposal, for the manufacture of molds for injection molding of plastics, a steel which has, in particular and at the same time, very great hardness, very good machinability, very good polishability or chemical grainability, good thermal conductivity and very great homogeneity of all these characteristics, even in the greatest thickness. Such an ideal steel is unknown.

PRIOR ART

To manufacture the molds, use is generally made of blocks of low-alloy steel which is sufficiently quenching to obtain, after quenching and annealing, a martensitic or bainitic structure substantially free from ferrite, which has a sufficient hardness, a high yield point and good toughness.

The steels most widely employed are steel P20 according to the AISI standard and steels W1.2311 or W1.2738 according to the German Werkstoff standard.

Steel P20 contains, by weight, from 0.28% to 0.4% of carbon, from 0.2% to 0.8% of silicon, from 0.6% to 1% of manganese, from 1.4% to 2% of chromium and from 0.3% to 0.5% of molybdenum, the remainder being iron and impurities resulting from the production.

Steels W1.2311 and W1.2738 contain, by weight, from 0.35% to 0.45% of carbon, from 0.2% to 0.4% of silicon, from 1.3% to 1.6% of manganese, from 1.8% to 2.10% of chromium and from 0.15% to 0.25% of molybdenum; steel W1.2738 additionally contains from 0.9% to 1.2% of nickel, the remainder being iron and impurities linked with the production.

The steels have a good wear resistance. However, the inventors have found in particular that the combination of their thermal conductivity and quenchability characteristics was insufficient. Steel W1.2738 is substantially more quenching than steel W1.2311 which, itself, is more quenching than steel P20. However, steel W1.2738 has a thermal conductivity that is substantially lower than that of steel W1.2311, itself substantially lower than that of steel P20. Because the steel which has the best thermal conductivity has the worst quenchability, and vice versa, it is not possible to manufacture very massive molds which have good thermal conductivity. If it was intended to manufacture a large-sized mold which has a good thermal conductivity, it would be necessary to employ steel P20 instead of steel W1.2738, and to design the mold as several relatively small components instead of designing it as a very large single component. However, this technique is never employed, or even envisaged, because it would have the disadvantage of considerably complicating and increasing the cost of manufacture of the molds. In fact, it would be necessary to ensure a perfect fit of the various components, to avoid forming surface markings on the objects manufactured by molding, and in practice this is not possible.

SUMMARY OF THE INVENTION

The aim of the present invention is to overcome this disadvantage by providing a steel which at the same time has the main characteristics which are desired for a steel intended for mold manufacture, and especially very good resistance to wear, and a combination of quenchability and thermal conductivity characteristics which is better than what the prior art allows to be obtained.

For this purpose the invention has as its subject-matter a steel for the manufacture of molds for injection molding of plastics or rubber, whose chemical composition contains, by weight:

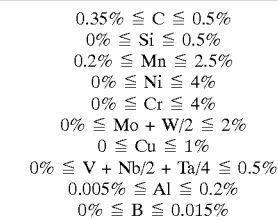

optionally, at least one element taken from titanium and zirconium, in contents such that the sum of the titanium content and of half the zirconium content is smaller than or equal to 0.3%, optionally, at least one element taken from sulfur, selenium and tellurium, the sum of the contents of these elements being smaller than or equal to 0.2%, optionally, at least one element taken from lead and bismuth, the sum of the contents of these elements being smaller than or equal to 0.2%, optionally, calcium in a content lower than or equal to 0.1%, the remainder being iron and impurities resulting from the production; the analysis simultaneously satisfying the following relationships (the contents being expressed in % by weight):

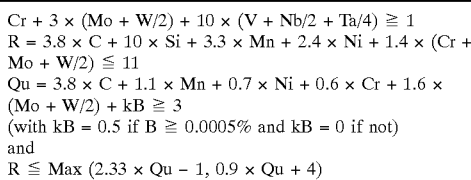

The chemical composition is preferably such that:

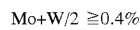

It is also preferable that $Si \leq 0.15\%$ and, better still, that $Si \leq 0.1\%$.

Finally, it is desirable that the boron content should be greater than or equal to 0.0005%.

The composition of the steel must preferably be chosen so that $R \leq 9$ and, optionally, $Qu \geq 4.3$.

The above conditions are obtained in a particularly favorable manner when the chemical composition of the steel is such that:

$$0.37\% \leq C \leq 0.45\%$$
$$0\% \leq Si \leq 0.15\%$$
$$0.2\% \leq Mn \leq 1.5\%$$
$$0\% \leq Ni \leq 0.5\%$$
$$0\% \leq Cr \leq 2.5\%$$
$$0\% \leq Mo + W/2 \leq 1\%$$
$$0 \leq Cu \leq 1\%$$
$$0\% \leq V + Nb/2 + Ta/4 \leq 0.2\%$$
$$0.005\% \leq Al \leq 0.2\%$$
$$0.0005\% \leq B \leq 0.015\%$$
$$0\% \leq Ti + Zr/2 \leq 0.3\%$$

the composition additionally satisfying the relationship:

$$R \leq 2.33 \times Qu - 2.4.$$

When the steel contains titanium or zirconium, which is preferable, it is desirable that, during the manufacture, the titanium or the zirconium should be introduced gradually into the liquid steel so as to obtain a very fine precipitation of titanium or zirconium nitrides. It is then necessary that the titanium, zirconium and nitrogen contents (in % by weight) should be preferably such that:

$$0.00003 \leq (N) \times (Ti + Zr/2) \leq 0.0016.$$

In these conditions, in the solid state, the number of titanium or zirconium nitride precipitates of size greater than 0.1 μm, counted over an area of 1 mm² of a micrographic section, is smaller than 4 times the sum of the total content of titanium precipitated in the form of nitrides and of half the total content of zirconium precipitated in the form of nitrides, expressed in thousandths of % by weight.

Finally, the invention relates to a block of steel whose chemical composition is in accordance with the invention, the characteristic dimension of the block being approximately between 20 mm and 1500 mm, the structure of the steel being, at all points of the block, martensitic or bainitic, essentially free from ferrite, and the hardness being, at all points of the block, between 250 Brinell and 370 Brinell and, preferably, between 270 Brinell and 350 Brinell.

The steel according to the invention can also be employed for the manufacture of molds for plastics by using foundry techniques.

DETAILED DESCRIPTION OF PREFERRED EMBODIMENTS

The invention will now be described in greater detail, but without any limitation being implied, and will be illustrated by the examples which follow.

To obtain all the use properties that are necessary for the manufacture of molds for injection molding of plastics, the chemical composition of the steel must include, by weight:

more than 0.35% of carbon, to obtain, at the same time, sufficient hardness and very good wear resistance, wear resistance which, at equal hardness, is proportionally better the higher the carbon content; however, the carbon content must not be too high, to preserve satisfactory machinability and toughness; hence, the carbon content must remain lower than or equal to 0.5%; the carbon content must preferably be between 0.37% and 0.45%;

molybdenum, preferably more than 0.4%, to increase quenchability and, in particular, to increase the extent of the bainitic domain, which makes it possible to obtain good homogeneity of characteristics in thick blocks; molybdenum also has the advantage of increasing the resistance to annealing and of forming carbides with carbon which, at equal strength, increase the wear resistance; however, the molybdenum content does not need to be higher than 2% to obtain the full effect of this element and, preferably, the molybdenum content is limited to 1%, especially because this element is very costly and because it promotes the formation of segregations which are unfavorable for machinability and polishability; molybdenum may be completely or partially substituted by tungsten in a proportion of 2% of tungsten per 1% of molybdenum; the chemical composition conditions are therefore defined by the quantity Mo+W/2;

chromium, between 0% and 4% and preferably between 1.5% and 2.5%, to improve the quenchability and to improve resistance to softening and to wear, without excessively deteriorating thermal conductivity;

optionally, vanadium, niobium or tantalum, by themselves or in combination, the sum V+Nb/2+Ta/4 being between 0% and 0.5% and, preferably, smaller than or equal to 0.2%, to increase hardness and to improve wear resistance;

more than 0.2% of manganese, which has the advantage of binding sulfur and of increasing quenchability, but which has the disadvantage of appreciably decreasing the thermal conductivity of steel, so that its content is limited to 2.5% and, preferably, to 1.5%;

less than 0.5% and preferably less than 0.15% and, better still, less than 0.1% of silicon, an element employed for deoxidizing liquid steel, but which has the disadvantage of very appreciably increasing the thermal resistivity of steel and of promoting the formation of mesosegregations on blocks of large size; the silicon content must preferably be as low as possible;

optionally, nickel, in contents of between 0% and 4%, to increase quenchability and, preferably, less than 0.5%, so as not to reduce thermal conductivity too much; this element can also be present as a residual element when the steel is produced from iron scrap;

optionally, between 0% and 1% of copper, a residual element introduced by the raw materials, but which can have a favorable hardening effect when accompanied by nickel;

between 0.005% and 0.2% of aluminum, to deoxidize the steel and, where appropriate, to contribute to the boron protection of quenchability;

at least one element taken from titanium and zirconium, the sum of the titanium content and of half the zirconium content being smaller than or equal to 0.3%, in order to trap the nitrogen which steel always contains and which could neutralize the effect of boron; when the steel contains titanium or zirconium, it is preferable that the contents of titanium, zirconium and nitrogen (an element which is always present, at least as an impurity and in contents of between a few ppm and some hundreds of ppm) are such that:

$$0.00003 \leq (N) \times (Ti+Zr/2) \leq 0.0016$$

and that the titanium or zirconium is introduced into the steel by gradual dissolving of an oxidized titanium or zirconium phase, for example by performing the addition of titanium or zirconium into undeoxidized steel and then by adding a strong deoxidizer such as aluminum; conditions which make it possible to obtain a very fine dispersion of titanium nitrides, which can favor impact strength, machinability and polishability; when the titanium or zirconium is introduced in this preferred manner, the number of titanium or zirconium nitrides of size greater than 0.1 µm, counted over an area of 1 mm$^2$ of a micrographic section of solid steel, is smaller than 4 times the sum of the total content of titanium precipitated in the form of nitrides and of half the total content of zirconium precipitated in the form of nitrides, expressed in thousandths of %;

optionally, boron, between 0% and 0.015%, and preferably more than 0.0005% and, better still, more than 0.002%, to increase quenchability without deteriorating thermal conductivity;

sulfur, either as impurity, that is to say in contents lower than 0.005%, or as an addition, optionally accompanied by selenium or tellurium, to improve machinability; the sum of the sulfur, selenium and tellurium contents being smaller than or equal to 0.2%; machinability can also be improved by an addition of lead or bismuth in contents lower than or equal to 0.2% or else by an addition of calcium in a content lower than or equal to 0.1%;

the remainder being iron and impurities resulting from production.

Within this composition region the content of each of the elements must be such that, if R is a quantity which represents the thermal resistivity of the steel, and Qu a quantity which represents its quenchability, the following conditions are obeyed:

$R \leq 11$ and, preferably, $R \leq 9$ $Qu \geq 3$ and, preferably, $Qu \geq 4.3$ In these expressions R and Qu are dimensionless coefficients which are calculated using the formulae:

---
R = 3.8 × C + 10 × Si + 3.3 × Mn + 2.4 × Ni +
1.4 × (Cr + Mo + W/2)
Qu = 3.8 × C + 1.1 × Mn + 0.7 × Ni + 0.6 × Cr +
1.6 × (Mo + W/2) + kB
with kB = 0.5 if B ≥ 0.0005% and kB = 0 if not.
---

These conditions make it possible to obtain a quenchability that is sufficient for the structure, after quenching, to be martensitic or bainitic (the structure may be mixed martensito-bainitic), essentially free from ferrite (ferrite is not desired, but a small remainder may remain), and in order to obtain a thermal conductivity of the steel which makes it possible to increase the output efficiency of the injection molding equipment.

When the ratio of the coefficients is calculated for each element from each of the two above formulae it is found that silicon, nickel and, to some extent, manganese are elements which are unfavorable and whose contents must be adjusted to the lowest level compatible with the various metallurgical constraints and, on the other hand, that preference must be given, in this order, to boron, molybdenum (or tungsten), carbon and chromium, which are elements that are highly favorable in terms of contribution to quenchability at a given effect on thermal resistivity. More precisely, on calculating the ratios of the coefficients involved in the formulae for R and Qu, for the coefficients of molybdenum, carbon and chromium, it seemed to the inventors that the chemical composition of the steel should satisfy the relationship:

$R \leq Max(2.33 \times Qu - 1, 0.9 \times Qu + 4)$

This expression means that R must be smaller than or equal to the larger of the two values 2.33×Qu−1 and 0.9×Qu+4.

Finally, to obtain a hardness greater than 250 BH after an annealing at a temperature higher than 500° C., needed to obtain good stability of the properties of the steel and a satisfactory impact strength, the molybdenum, tungsten, chromium, vanadium, niobium and tantalum contents must be such that:

Cr+3×(Mo+W/2)+10×(V+Nb/2+Ta/4)≥1

All these relationships must be satisfied simultaneously.

In the composition region thus defined a preferred region can be determined by the following conditions:

---
0.37% ≤ C ≤ 0.45%
0% ≤ Si ≤ 0.15%
0.2% ≤ Mn ≤ 1.5%
0% ≤ Ni ≤ 0.5%
0% ≤ Cr ≤ 2.5%
0% ≤ Mo + W/2 ≤ 1%
0 ≤ Cu ≤ 1%
0% ≤ V + Nb/2 + Ta/4 ≤ 0.2%
0.005% ≤ Al ≤ 0.2%
0.005% ≤ B ≤ 0.015%
0% ≤ Ti + Zr/2 ≤ 0.3%
Cr + 3 × (Mo + W/2) + 10 × (V + Nb/2 + Ta/4) ≥ 1
R ≤ 2.33 × Qu − 2.4
--- it being possible for the steel additionally to contain the other elements already indicated above (sulfur, selenium, tellurium, bismuth, lead and calcium); titanium being preferably introduced in the way indicated above.

Although steels whose carbon content is of the order of 0.4% are generally considered to be difficult to weld, the molds manufactured with the steel according to the invention can be repaired by welding which employs preheating and postheating to a temperature above or equal to approximately 300° C. From this point of view the composition region chosen has the advantage of facilitating treatment after repair (machining, polishing, graining) because the hardness difference ΔH between the base metal and the ZAH of welding remains moderate (less than 100 BH) and, at equal quenchability, is substantially lower than the differences in hardness between ZAH and base metal obtained with the steels according to the prior art.

To manufacture a block of steel that can be employed for the manufacture of molds, liquid steel is produced, is cast in the form of a semiproduct such as an ingot or a slab and the semiproduct is then rolled or forged to obtain a block which can, for example, be a sheet. The semiproduct is then subjected to a heat treatment of quenching and annealing, intended to give it a martensitic or bainitic structure essentially free from ferrite, a component that is unfavorable for machinability. The block which, in general, is of parallelepipedal shape has a characteristic dimension d, in most cases the smallest dimension which, in combination with the nature of the quenching medium, determines the rate of cooling at the core. For the core structure to be free from ferrite the quenchability of the steel must be sufficient for the critical rate of appearance of ferrite to be lower than the rate of cooling at the core.

The annealing must be performed above 500° C. and, better still, above 550° C. but below the $Ac_1$ point of the steel.

The steel according to the invention presents a particular advantage for the manufacture of molds using foundry techniques. The molds thus obtained are made of cast steel and not of wrought steel as described above. According to this process, instead of machining the mold cavity from a massive parallelepipedal block in which channels are pierced for cooling using water circulation, a mold blank is manufactured by foundry techniques, comprising a blank of the mold cavity and external parts which have an appropriate shape to ensure a sufficient mechanical strength while resulting in walls which are much less thick than those obtained by the technique of machining the cavity from a massive block. The mold itself is obtained by a finishing machining of the blank and by a heat treatment. Since the thickness of the walls of the mold is relatively small, the use of the steel according to the invention, whose thermal conductivity is very good, makes it possible to reduce, or even to eliminate, the cooling using water circulation in channels pierced in the walls of the mold, and to ensure the cooling of the mold, when in use, by a gas circulation around the outer parts of the mold. The machining of the cavity often causes the appearance of porosities, which are repaired by welding. The relatively good weldability of the steel makes this operation easier. The heat treatment is identical with the heat treatment performed on molds made of welded steel; however, it may be preceded by one or more austenitizations intended to refine the grain.

To give an example, steels A, B, C and D according to the invention and steels E, F and G according to the prior art were produced. The chemical compositions of these steels were (in thousandths of % by weight):

|   | C | Si | Mn | Ni | Cr | Mo | V | B | Al | Ti | N |
|---|---|---|---|---|---|---|---|---|---|---|---|
| A | 400 | 60 | 300 | 200 | 1900 | 650 | 50 | 3 | 20 | 35 | 5 |
| B | 410 | 50 | 520 | 190 | 2220 | 810 | — | 3 | 30 | 23 | 6 |
| C | 380 | 80 | 1050 | 150 | 975 | 780 | — | 2 | 60 | — | 6 |
| D | 410 | 55 | 750 | 210 | 1925 | 850 | — | — | 25 | — | 6 |
| E | 395 | 300 | 1490 | 210 | 1920 | 270 | — | — | 30 | — | 6 |
| F | 410 | 310 | 1410 | 980 | 1950 | 280 | — | — | 27 | — | 5 |
| G | 400 | 200 | 600 | 200 | 1400 | 400 | — | — | 25 | — | 7 |

With these steels, annealed quenched blocks usable for the manufacture of molds were manufactured. The thicknesses (characteristic dimension d) of the blocks, the quenching methods, the annealing conditions and the thermal resistivity coefficient R and quenchability coefficient Qu, the values of thermal conductivity, the hardnesses obtained and the hardness differences $\Delta H$ between ZAH and base metal were:

|   | d mm | quench | anneal | Qu | R | conduct. | hardness | $\Delta H$ |
|---|---|---|---|---|---|---|---|---|
| A | 140 | air | 600° C. | 4.77 | 7.16 | 51 | 320 | 5 |
| B | 900 | water | 600° C. | 5.4 | 8.47 | 47 | 310 | 55 |
| C | 600 | water | 600° C. | 5.13 | 8.53 | 47 | 330 | 16 |
| D | 600 | water | 620° C. | 5.05 | 8.97 | 46 | 325 | 53 |
| E | 150 | air | 600° C. | 4.9 | 12.9 | 39 | 320 | 107 |
| F | 700 | water | 600° C. | 5.4 | 14.8 | 37 | 305 | 135 |
| G | 180 | water | 600° C. | 3.8 | 8.5 | 47 | 278 | 44 | conduct. = thermal conductivity expressed in W/m/K hardness expressed as Brinell These results show that steels A, B, C and D according to the invention have quenchability values which are comparable with those of steels E and F according to the prior art, but much higher (nearly 30%) thermal conductivity values. Steel G according to the prior art has a thermal conductivity comparable with that of steels B, C and D but a quenchability that is much lower than that of these steels. Because of this low quenchability, the maximum thickness that can be manufactured is lower than 200 mm and the quenching must, absolutely, be done with water, which is a disadvantage with low thicknesses.

Steels A to D according to the invention have a hardness difference $\Delta H$ between ZAH and base metal which is smaller than 55 BH whereas steels E and F have a $\Delta H$ greater than 100 BH. Steel G according to the prior art has a low $\Delta H$ (44 BH), but it also has a very mediocre quenchability.

The steel according to the invention can be employed for the manufacture of blocks whose characteristic dimension is between 20 mm and at least 1500 mm, whose structure is, at all points, martensitic or bainitic, essentially free from ferrite, and whose hardness is, at all points, between 250 Brinell and 370 Brinell. These blocks can be employed for the manufacture of molds for injection molding of plastics or of rubber, or of any other material molded at a temperature which is preferably lower than approximately 500° C.

When the molds are repaired by welding, it is highly desirable that the added metal should have the same composition as the base metal; accordingly the steel according to the invention can be manufactured in the form of wire for welding or for the manufacture of welding electrodes.

We claim:

1. A steel for the manufacture of molds for injection molding of plastics or rubber, wherein its chemical composition contains, by weight:

$0.35\% \leq C \leq 0.5\%$
$0\% \leq Si \leq 0.5\%$
$0.2\% \leq Mn \leq 2.5\%$
$0\% \leq Ni \leq 4\%$
$0\% \leq Cr \leq 4\%$
$0\% \leq Mo + W/2 \leq 2\%$
$0 \leq Cu \leq 1\%$ -continued $0\% \leq V + Nb/2 + Ta/4 \leq 0.5\%$
$0.005\% \leq Al \leq 0.2\%$
$0\% \leq B \leq 0.015\%$ optionally, at least one element taken from titanium and zirconium, in contents such that the sum of the titanium content and of half the zirconium content is smaller than or equal to 0.3%, optionally, at least one element taken from sulfur, selenium and tellurium, the sum of the contents of these elements being smaller than or equal to 0.2%, optionally, at least one element taken from lead and bismuth, the sum of the contents of these elements being smaller than or equal to 0.2%, optionally, calcium in a content lower than or equal to 0.1%, the remainder being iron and impurities resulting from the production, the analysis simultaneously satisfying the following relationships:

$$Cr + 3 \times (Mo + W/2) + 10 \times (V + Nb/2 + Ta/4) \geq 1$$
$$R = 3.8 \times C + 10 \times Si + 3.3 \times Mn + 2.4 \times Ni + 1.4 \times (Cr + Mo + W/2) \leq 11$$
$$Qu = 3.8 \times C + 1.1 \times Mn + 0.7 \times Ni + 0.6 \times Cr + 1.6 \times (Mo + W/2) + kB \geq 3$$

with $kB = 0.5$ if $B \geq 0.0005\%$ and $kB = 0$ if not, and $$R \leq \text{Max}(2.33 \times Qu - 1, 0.9 \times Qu + 4).$$

2. The steel as claimed in claim 1, wherein: $Si \leq 0.15\%$.

3. The steel as claimed in claim 1, wherein: $B \geq 0.0005\%$.

4. The steel as claimed in claim 1, wherein: $R \leq 9$.

5. The steel as claimed in claim 1, wherein: $Qu \geq 4.3$.

6. The steel as claimed in claim 1, wherein: $Si \leq 0.1\%$.

7. The steel as claimed in claim 1, wherein:

$$0.37\% \leq C \leq 0.45\%$$
$$0\% \leq Si \leq 0.15\%$$
$$0.2\% \leq Mn \leq 1.5\%$$
$$0\% \leq Ni \leq 0.5\%$$
$$0\% \leq Cr \leq 2.5\%$$
$$0\% \leq Mo + W/2 \leq 1\%$$
$$0 \leq Cu \leq 1\%$$
$$0\% \leq V + Nb/2 + Ta/4 \leq 0.2\%$$
$$0.005\% \leq Al \leq 0.2\%$$
$$0.0005\% \leq B \leq 0.015\%$$
$$0\% \leq Ti + Zr/2 \leq 0.3\%$$
and
$$R \leq 2.33 \times Qu - 2.4.$$

8. The steel as claimed in claim 1, wherein the titanium, zirconium and nitrogen contents are preferably such that:

$$0.00003 \leq (N) \times (Ti + Zr/2) \leq 0.0016$$

and wherein, in the solid state, the number of titanium or zirconium nitride precipitates of size greater than 0.1 μm, counted over an area of 1 mm² of a micrographic section, is smaller than 4 times the sum of the total content of titanium precipitated in the form of nitrides and of half the total content of zirconium precipitated in the form of nitrides, expressed in thousandths of % by weight.

9. A block of steel as claimed in claim 1, wherein its characteristic dimension is between 20 mm and 1500 mm, the structure of the steel is, at all points, martensitic or bainitic and the hardness is, at all points, between 250 Brinell and 370 Brinell.

10. A process for manufacturing a mold, comprising casting the steel claimed in claim 1 using foundry techniques to form the mold.

11. A wire for welding or for the manufacture of welding electrodes, wherein it consists of a steel according to claim 1.

12. A steel for manufacturing molds for injection molding of plastics or rubber, the steel comprising, by weight:

$$0.35\% \leq C \leq 0.5\%,$$
$$0\% \leq Si \leq 0.5\%,$$
$$0.2\% \leq Mn \leq 2.5\%,$$
$$0\% \leq Ni \leq 4\%,$$
$$0\% \leq Cr \leq 4\%,$$
$$0\% \leq Mo + W/2 \leq 2\%,$$
$$0 \leq Cu \leq 1\%,$$
$$0\% \leq V + Nb/2 + Ta/4 \leq 0.5\%,$$
$$0.005\% \leq Al \leq 0.2\%,$$
$$0\% \leq B \leq 0.015\%,$$

the remainder of the steel being iron and impurities resulting from production of the steel, wherein $$Cr + 3 \times (Mo + W/2) + 10 \times (V + Nb/2 + Ta/4) \geq 1;$$
$$R = 3.8 \times C + 10 \times Si + 3.3 \times Mn + 2.4 \times Ni + 1.4 \times (Cr + Mo + W/2) \leq 11;$$
$$Qu = 3.8 \times C + 1.1 \times Mn + 0.7 \times Ni + 0.6 \times Cr + 1.6 \times (Mo + W/2) + kB \geq 3,$$

with $kB = 0.5$ if $B \geq 0.0005\%$ and $kB = 0$ if not; and $$R \leq \text{Max}(2.33 \times Qu - 1, 0.9 \times Qu + 4).$$

13. The steel as claimed in claim 12, further comprising at least one element taken from titanium and zirconium, wherein a sum of a titanium content and half a zirconium content is less than or equal to 0.3%.

14. The steel as claimed in claim 12, further comprising at least one element taken from sulfur, selenium and tellurium, wherein a sum of a sulfur content, a selenium content and a tellurium content is less than or equal to 0.2%.

15. The steel as claimed in claim 12, further comprising at least one element taken from lead and bismuth, wherein a sum of a lead content and a bismuth content is than or equal to 0.2%.

16. The steel as claimed in claim 12, further comprising calcium, wherein a calcium content is less than or equal to 0.1%.

17. The steel as claimed in claim 13, further comprising nitrogen, wherein the titanium content, the zirconium content and a nitrogen content are such that:

$$0.00003 \leq (N) \times (Ti + Zr/2) \leq 0.0016$$

and wherein, in a solid state, at least one of a content of titanium nitride precipitates, and a content of zirconium nitride precipitates, the precipitates being of size greater than 0.1 μm and counted over an area of 1 mm² of a micrographic section, is smaller than 4 times a sum of a total titanium nitride content and half a total zirconium nitride content, the contents being expressed in thousandths of % by weight.

18. A process for manufacturing a mold, comprising casting the steel claimed in claim 12 using foundry techniques to form the mold.

19. A wire for welding or for manufacturing welding electrodes, the wire comprising the steel according to claim 12.

20. The steel as claimed in claim 12, wherein a thermal conductivity of the steel is at least about 46 W/m/K.

* * * * *